(12) United States Patent
Waibel et al.

(10) Patent No.: US 6,704,097 B2
(45) Date of Patent: Mar. 9, 2004

(54) OPTOELECTRONIC DISTANCE MEASURING DEVICE AND OPERATING METHOD DETERMINED THEREFOR

(75) Inventors: Reinhard Waibel, Berneck (CH); Manfred Ammann, Lauterach (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/863,726

(22) Filed: May 23, 2001

(65) Prior Publication Data

US 2001/0048516 A1 Dec. 6, 2001

(30) Foreign Application Priority Data

May 31, 2000 (DE) .......................................... 100 27 077

(51) Int. Cl.$^7$ ................................................. G01C 3/08
(52) U.S. Cl. ........................ 356/4.01; 356/5.01; 356/5.1
(58) Field of Search ................................ 356/3.01–5.15

(56) References Cited

U.S. PATENT DOCUMENTS 4,730,190 A * 3/1988 Win et al.
5,100,229 A * 3/1992 Lundberg et al.
5,486,690 A * 1/1996 Ake
5,623,335 A * 4/1997 Bamberger ................ 356/5.01
5,689,330 A * 11/1997 Gerard et al.
5,949,529 A * 9/1999 Dunne et al. .............. 356/4.01
6,108,071 A * 8/2000 Landry et al. ............. 356/5.05
6,229,598 B1 * 5/2001 Yoshida .................... 356/5.01

* cited by examiner

*Primary Examiner*—Stephen C. Buczinski
(74) *Attorney, Agent, or Firm*—Sidley Austin Brown & Wood, LLP

(57) ABSTRACT

The optoelectronic distance measuring, signal processing and display device and the operating method upon which such a device is based are characterized in that a current function state of the device and changes made thereto by the user are shown graphically on a display of the device by at least one of icons, numbers and symbols, wherein active changes in the currently indicated function state are carried out exclusively by selecting at least one of the respective icons and numerical input. In such a device, no language-specific or country-specific fonts and programming language components are needed.

8 Claims, 6 Drawing Sheets

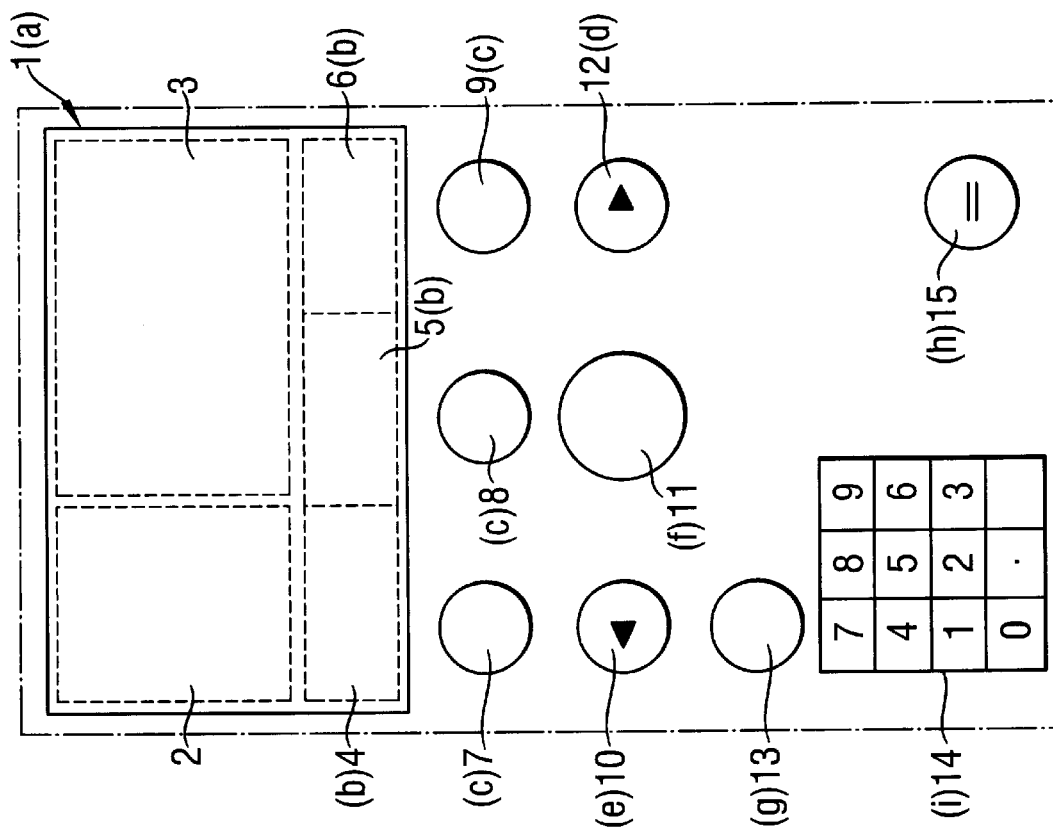

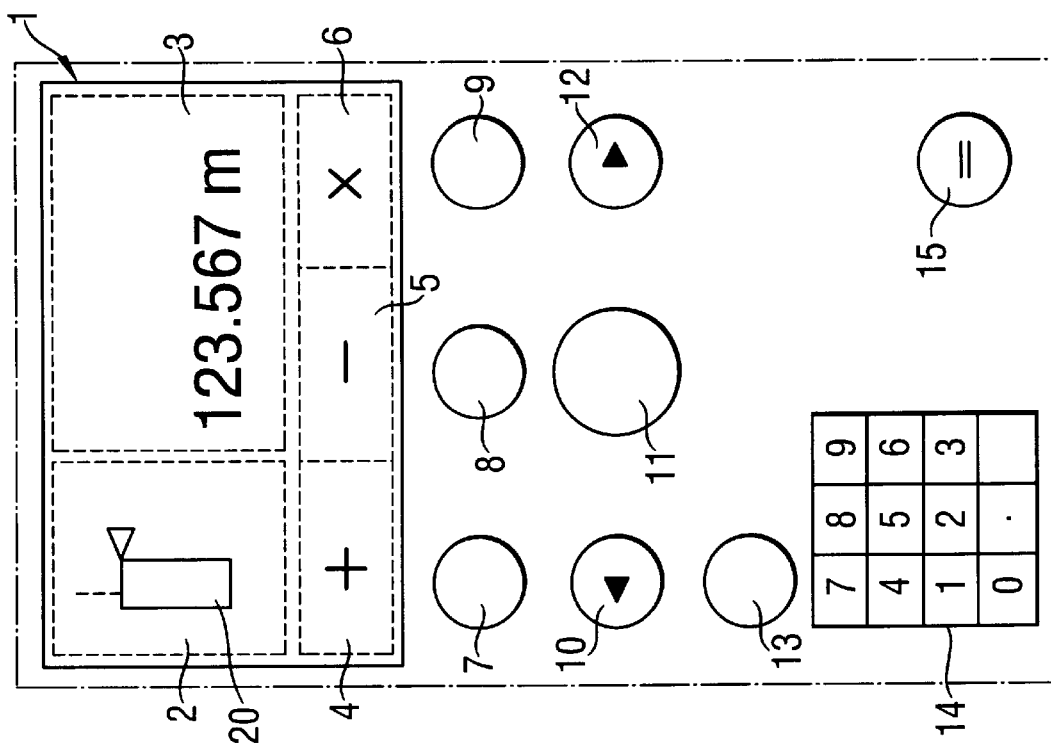
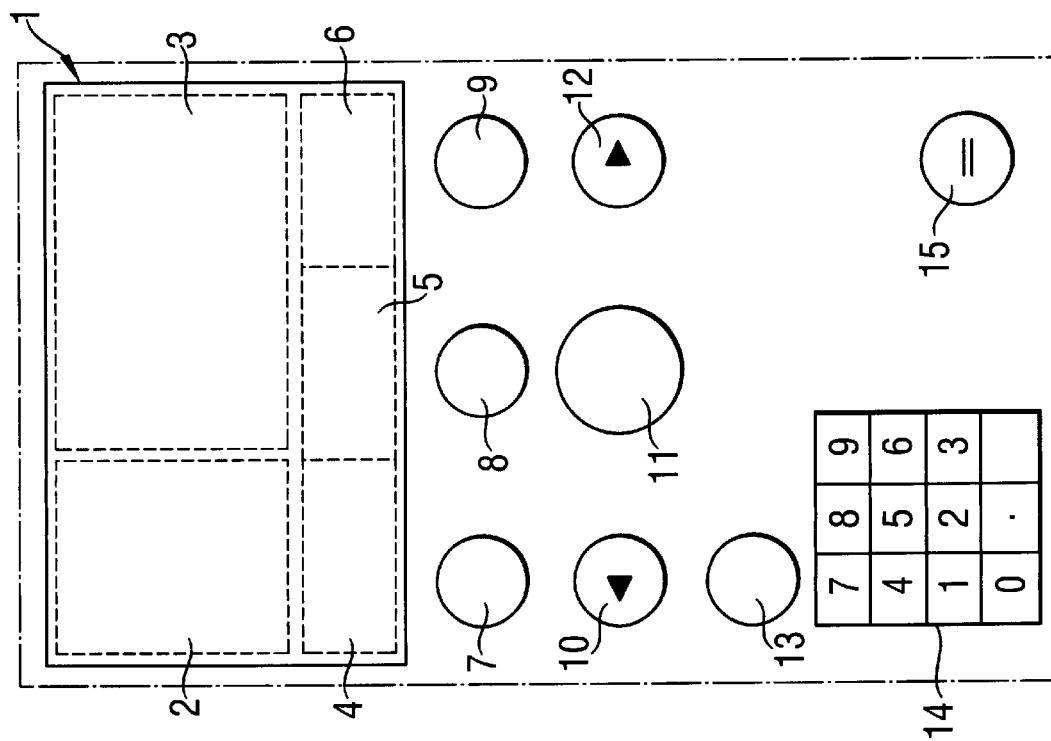

OPTOELECTRONIC DISTANCE MEASURING DEVICE AND OPERATING METHOD DETERMINED THEREFOR

BACKGROUND OF THE INVENTION

Optoelectronic distance measuring devices, especially laser distance measuring devices, in which a distance to be measured is displayed on a display of the device immediately after being measured are known. The measured values are subjected to evaluation algorithms by entering determined measurement value processing commands and the results obtained from this are shown on the display.

Devices of this type are sold globally. As a result, there is not only a demand for improvement and expansion of such measuring devices with respect to their function possibilities, but also there is a demand for representing the information shown on the display in a language-independent clear manner and for simplified handling of this information, particularly with regard to further processing.

SUMMARY OF THE INVENTION

With respect to an operating method for an optoelectronic distance measuring, measurement signal processing and display device whose measurement signals are stored within the device, combined with function and display, the invention provides that the current function state of the device and changes in the function state which can be carried out externally are shown graphically only by icons, numbers and/or symbols, and the active changes in the currently displayed function state are carried out exclusively by selecting the icon and/or by means of entering numbers.

In accordance with the invention, the interface between the user and the measuring device, also known as man-machine interface (MMI), is based entirely on icons, numbers and/or symbols which are graphically depicted. Accordingly, no country-specific letters, characters or the like are used to display information.

Such icons, numbers and/or symbols are also used for entering information into the measuring device and for its operation; that is, the measuring device is operated only by country-independent operator control elements so that no language-specific knowledge is necessary to operate it.

Icon and symbols also include very simple graphic elements such as lines, points and other graphic elements by which information can be conveyed.

The exclusive use of country-independent graphic symbols is advantageous such that the measuring device can be used in the same way in every country of the world without the need for corresponding conversion of the device or for the manufacture and storage of such measuring devices which are individualized with respect to language. Accordingly, time-consuming adaptation to respective languages and the use of special fonts which are necessary, for example, for Latin, katekana or even kanji, can be dispensed with entirely.

The graphic depiction of information is preferably carried out on a display. Each individual combination of symbols shown on the display corresponds to a function state of the measuring device. These function states are linked in a hierarchical manner. A change from one function state to the other is accomplished by operating the measuring device or by automatic activity in the measuring device and is revealed by a change in the icon, symbol and/or number combination or by means of audible signals.

If the measuring device still requires certain data, for example, to measure a distance, the user is notified of this, for example, by the addition and display of a new symbol, by the blinking of a symbol, which is already shown, or the like, which corresponds to a new function state. The user can then convey the desired information to the measuring device by selecting the icon or by entering numbers, so that the device enters a new function state which is represented by a new graphic combination. In this way it is possible to solve complex tasks interactively by running through a chain of function states; this represents a substantially simplified user control for the inexperienced user due to the exclusively graphic display of the individual function states. This user can, as it were, proceed from branch to branch on the graphic function tree. Changes in the currently displayed function state which are carried out by the user by operating the measuring device are referred to hereinafter as active changes of the function state.

In order to make the graphic representation as manageable as possible, the device itself determines which of the displayed data are superfluous during a change in the function state and cancels them automatically.

All of the active function state changes caused by or attempted by the user are checked for plausibility by the measuring device. For example, when measuring a triangle, the measured hypotenuse must be longer than the other two measured sides. This has the advantage that the measuring device can notify the user in such a case by means of a graphic warning and can suggest a correction in the form of an icon or symbol. The user can then accept the correction suggestion by selecting this icon or symbol.

The icons or symbols are selected by actuating input elements which are associated with these icons or symbols, e.g., keys or by a touch screen method in which a change in function state is caused by touching the appropriate icon directly on the display.

The symbols and icons are preferably designed such that they can be distinguished easily from one another and are self-explanatory, so that different groups of function states such as measurement function states, setup function states and computing function states can be easily differentiated or delimited, which represents a further simplification of operation.

The function states which are linked in a hierarchical manner can be divided into levels. For example, the respective start states for measurements of distance, surface or volume all form one level. This level—the current measurement job in this example—is indicated by a symbol or an icon or icon group on the display. The implementation of the measurement corresponding to this, that is, the selectable modes for executing this measurement task form a second level of function states which are on a lower hierarchical level than the level of the measurement job. The selectable execution modes are represented by a series of icons on the display, and the icon group defining the measurement job and the icon group representing the execution modes corresponding thereto are shown on the display simultaneously. This has the advantage that one's location in the function state tree, i.e., the task that the measuring device is handling, can be seen at a glance.

The evaluation of measured distance values and the execution of processing commands entered by the user is carried out inside the device by algorithms which combine the distance values, particularly trigonometrically, and show the results visually by an icon or number.

BRIEF DESCRIPTION OF THE INVENTION

In the following, the invention and advantageous details are described more fully in embodiment examples with reference to the drawings.

FIG. 1 shows the interaction of application and function relationships, function processing and function combination in an optical distance measuring device, according to the invention;

FIG. 2A shows and example of a method according to the invention;

FIG. 2B shows an alternative example of a method according to the invention;

Figure 3A:
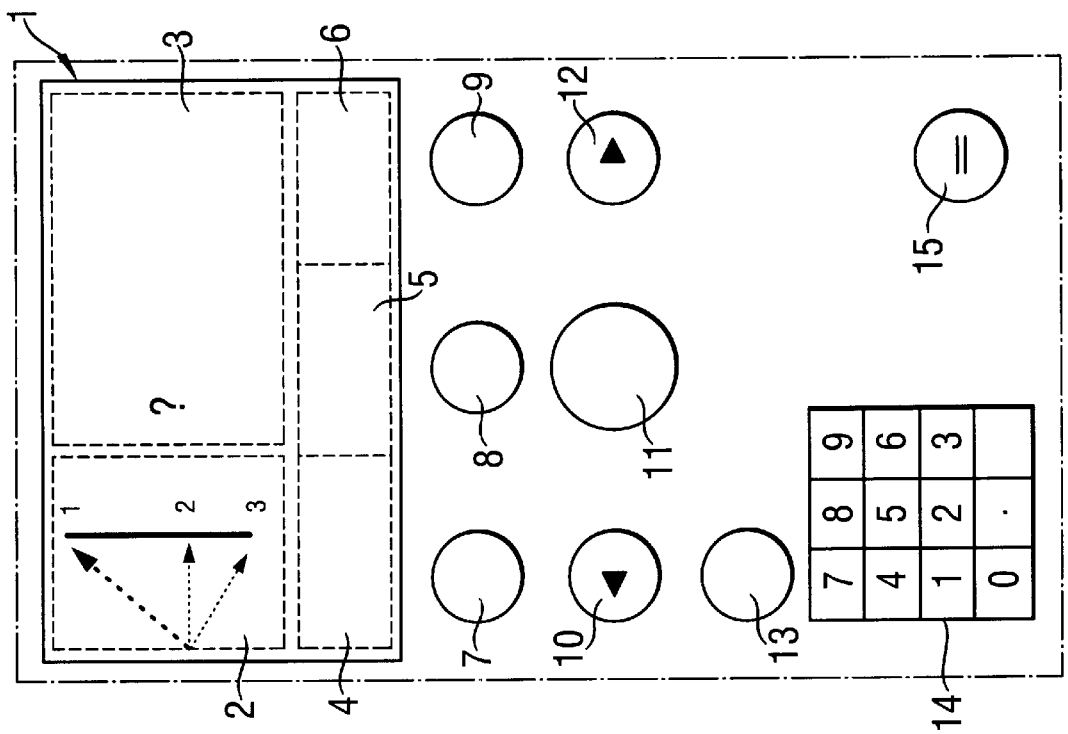
Figure 2D:
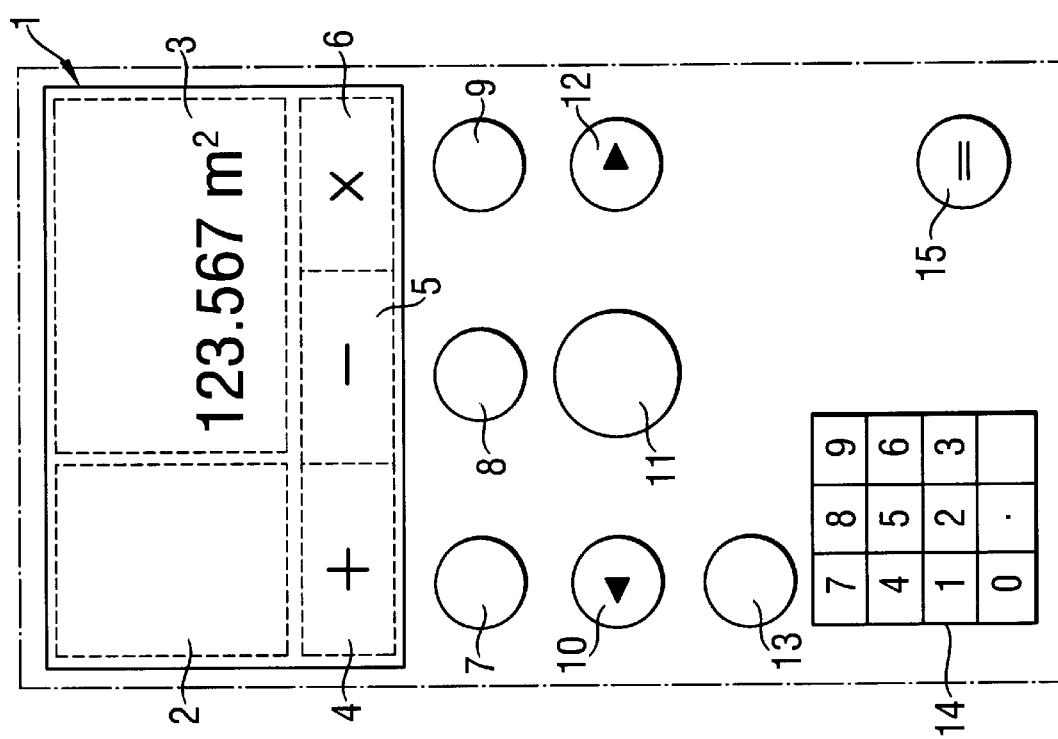
FIG. 2D shows a display of the results of a surface measurement in a second display field according to the invention.
Figure 3C:
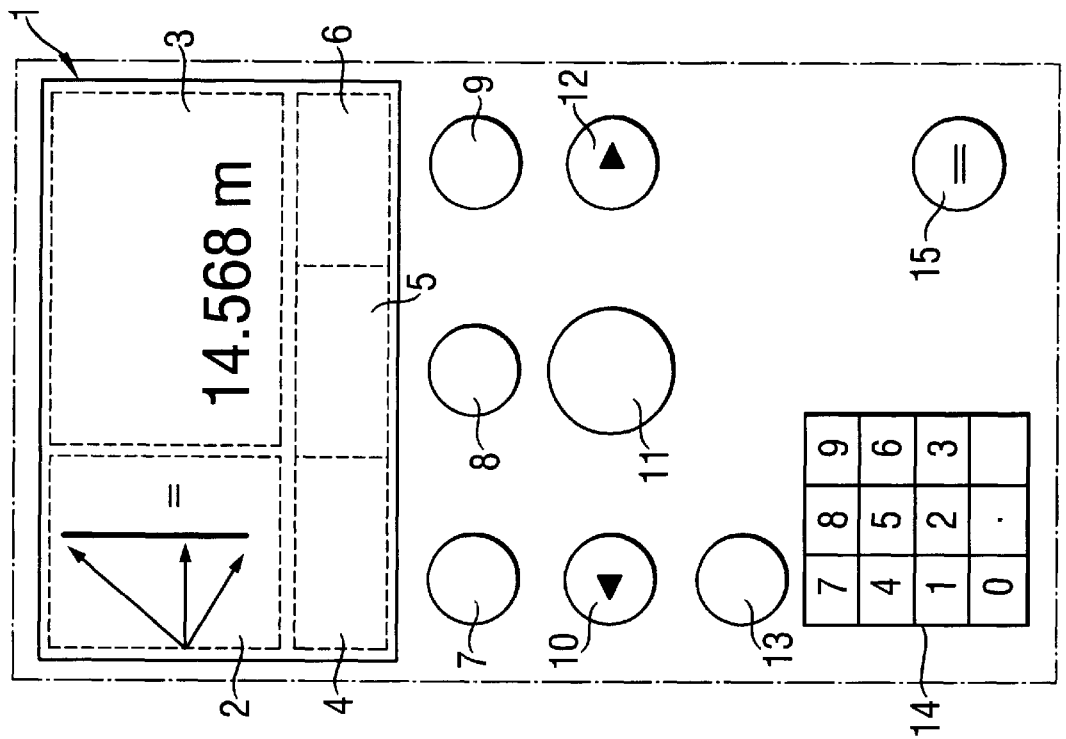
Figure 3B:
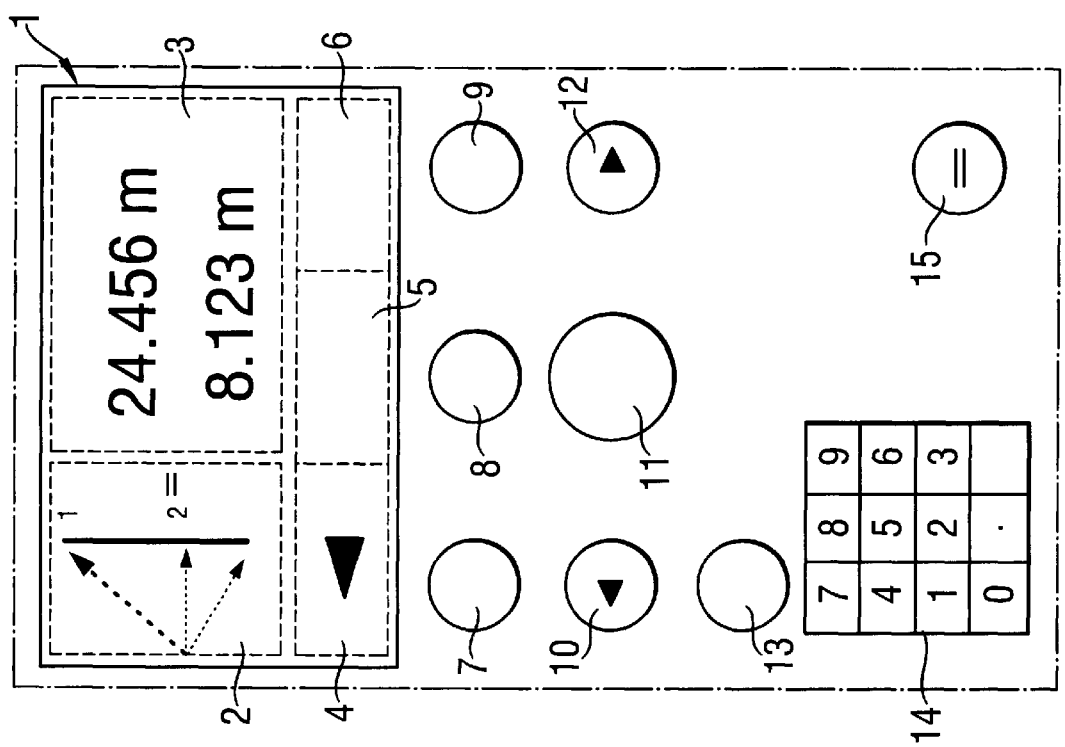
Figure 4A:
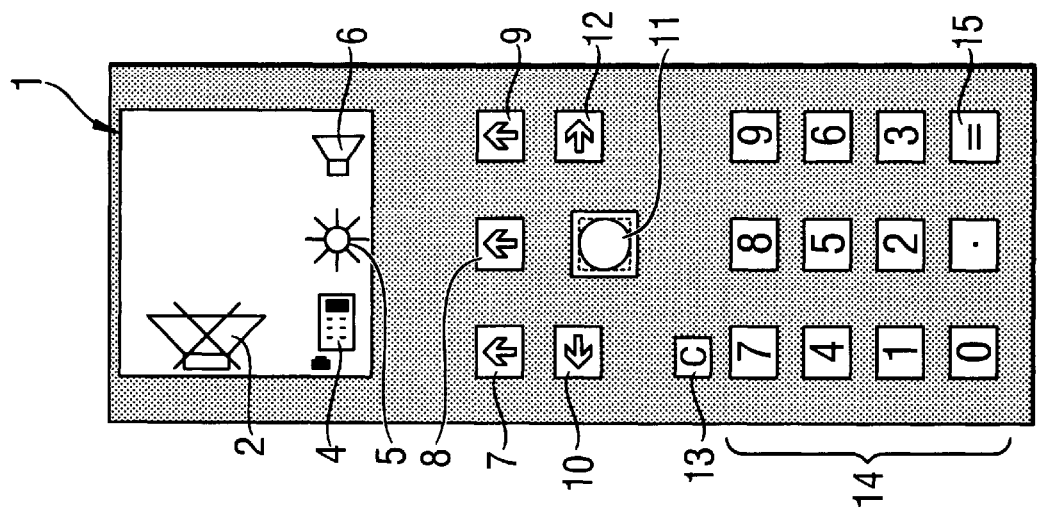
Figure 4B:
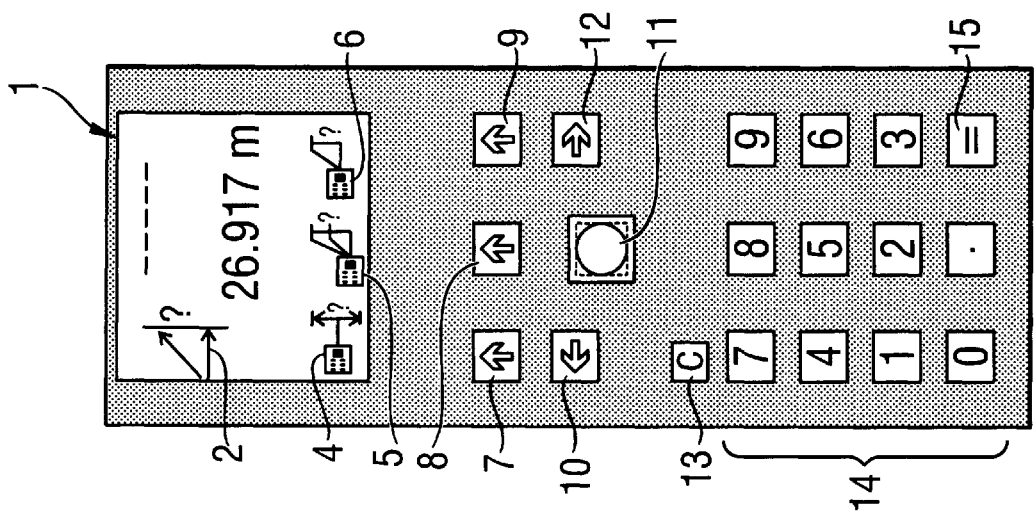
Figure 4C:
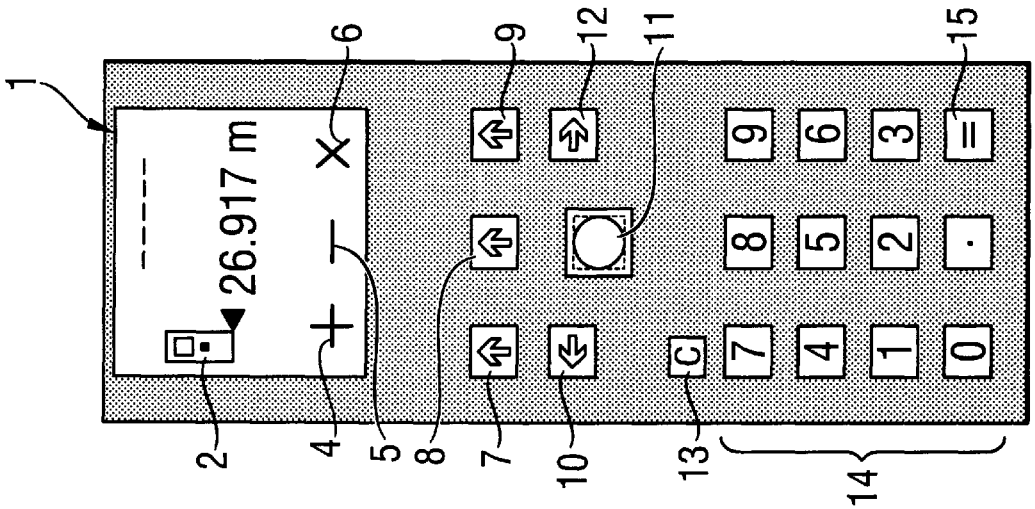

FIGS. 3A through 3C show an example of distance and/or surface calculation and display in which the user receives successive instructions from the device proceeding from a fixed location and after selection of a determined application mode (FIG. 3A) and arrives in a function state (FIG. 3C) representing the end of the measurement, including results, by entering information by means of selecting symbols; FIG. 3B illustrates an intermediate function state in which the measuring device waits for final information to complete the calculation;

FIG. 4A shows a distance measurement application according to the invention;

FIG. 4B shows an application and parameter input-interrogation according to the invention; and FIG. 4C shows operating settings according to the invention.

DETAILED DESCRIPTION OF THE INVENTION

The MMI interface of a preferred embodiment of a measuring device according to the invention is shown in FIG. 1.

The interface has a display surface 1 which is preferably formed by a display and in which a first display field 2 and a second display field 3 are integrated. The first display field 2 serves to show an icon or symbol representing the respective measurement job, the second display field 3 serves primarily to show numbers, but icons and symbols can also be shown. Further, a first 4, second 5 and third mode display field 6 are integrated in the display area 1 showing the possible alternatives for implementing the application shown in the first display field 2.

The icons indicated in the mode display fields 4, 5, 6 can be selected by assigned menu selection keys 7, 8, 9. The icons or symbols can also be selected by directly touching the symbols on the display that is constructed as a touch screen; this also applies to the icons or symbols shown in the display surface 1. Further, although the interface has back and forward keys 10, 12 to assist in navigating through the function state tree; it is also possible to select the symbols directly. A measurement key 11 preferably serves to start the measurement, for example, to emit a laser beam for distance measurement. A clear key 13 is preferably used to reset the measuring device to a preceding function state. Incorrect input can be corrected in this way. A number key field 14 is used for entering numerical values. An actuating key 15 is used for acknowledging input.

The manner of operation of the interface elements described above is additionally described in the text shown in FIG. 1. Such text is associated with the interface elements 1 to 15 by means of the reference letters a to h. Thus, the text associated with reference letter a describes preferred dimensions of display surface 1. The text associated with reference letter d shows that measured values which are stored by a preferably chronologically ordered structure can also be navigated by the back and forward keys 10, 12. According to reference letter g, the action of the clear key 13 first takes effect when the time over which this key is pushed exceeds or falls short of a predetermined time.

FIG. 2A shows the initial state before the start of a measuring and evaluating cycle. In such a state, all display fields 2, 3, 4 and 6 are preferably empty, i.e., no icons or numbers are displayed.

FIG. 2B shows the graphic state of the display surface 1 in a state after the selection of an application mode, wherein an icon 20 symbolizes "surface determination" and the menu selection keys 7, 8, 9 show insignificant or inapplicable symbols.

Figure 2C:
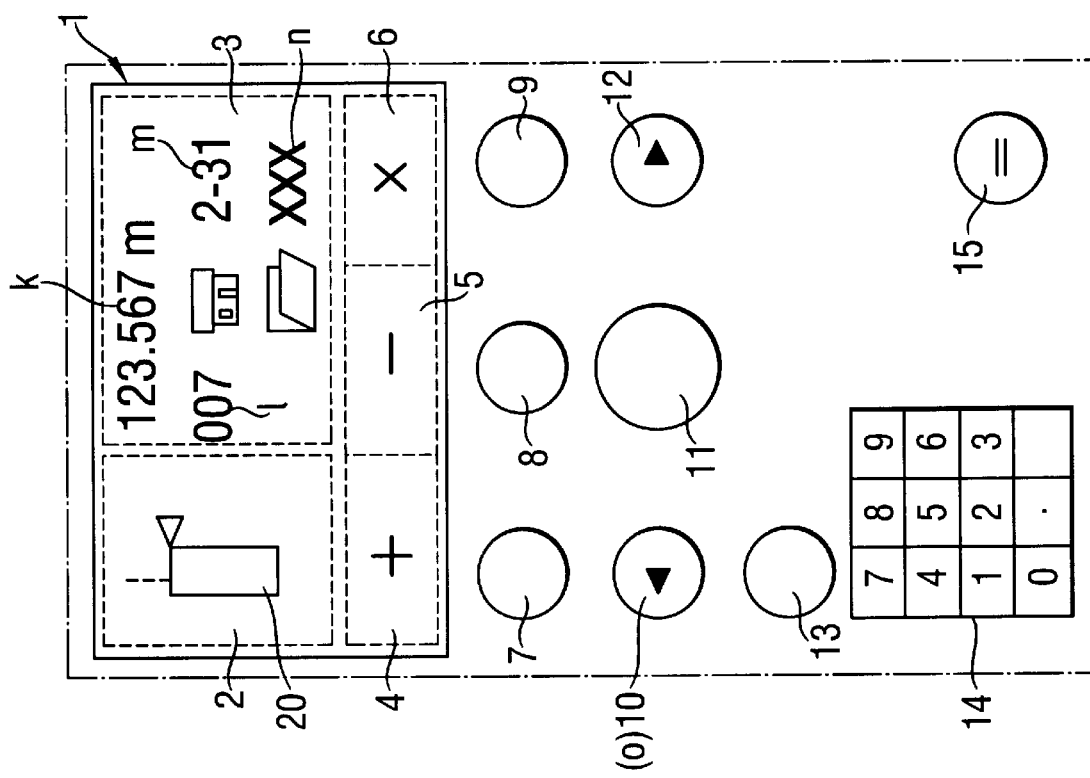
FIG. 2C shows the tagging and the identification of measured values and stored values according to the invention.

FIG. 2C shows the function state of the measuring device in which a measured distance value k to be stored is identified. The measured value k is given a point number e that is incremented by the storage process. This point number is preferably set to 0 immediately after the measuring device is turned on. The structure code described by m which is associated with this point number is preferably formed of three numbers which can be changed at any time and which are preferably identified by dashes or strokes during initialization. Arrow n describes a tagging value that can be selected before storing. The scroll key designated by arrow o is used to increment or decrement the numerical values of the point numbers and structure code.

Values which are not initialized are preferably shown by at least one vertical stroke.

What is claimed is:

1. An operating method for optoelectronic distance measuring including a measurement signal processing and display device for storing and displaying any measurement signal and its function, comprising the steps of: graphically displaying a current function state of the device and changes in the function state that can be initiated from outside only by at least one of icons, numbers and country-independent symbols; exclusively carrying out at least one of the steps of selecting the icons and entering the numbers to activate changes in the currently displayed function state, wherein the steps of selecting the icons and entering the numbers are performed by using country-independent operator control elements only that are designed such that no country specific language is required to use the country-independent operator control elements; linking together different function states by a hierarchical structure that can be divided into levels; using a corresponding icon group to visually display at all times at least two hierarchically different levels; using the icon group of the state level which is higher in the hierarchy to show a current measurement job of the measuring device; and using the icon group of the next lowest level to represent at least one of a possible pre-settable execution mode and a selectable execution mode of the measuring job.

2. The method of claim 1, further comprising the step of clearing the data that was previously visually displayed each time there is a change of function state.

3. The method of claim 1, further comprising the step of visually indicating, by at least one of icons and changes in the form of icons, impermissible function state changes caused by external input.

4. The method of claim 1, further comprising the step of acoustically indicating the impermissible function state changes.

5. The method of claim 1, further comprising the step of providing icons which are clearly distinguishable from one another for displaying different function group states such as measurement function states, setup function states and computing function states.

6. The method of claim 1, further comprising the step of providing at least one of a touch screen and keys for the selection of icons.

7. The method of claim 1, further comprising the steps of linking the measured distance values according to a trigonometric algorithm and an unknown quantity that can be preset and calculated by the algorithm and visually displaying the unknown quantity by means of at least one of an icon and a number.

8. Optoelectronic distance measuring, including a measurement signal processing and display device for storing and displaying any measurement signal and its function, comprising:

display means for graphically showing a current function state of the device and changes in the function state that can be initiated from outside, said display means only showing at least one of icons, numbers and country-independent symbols, and function state changing means for actively changing the currently displayed function state, said function state changing means being an exclusive means for at least one of selecting icons and entering numbers, wherein said means for selecting the icons and entering numbers are country-independent operator control elements only that are designed such that no country specific language us needed to use them, wherein different function states are linked together by a hierarchical structure that can be divided into levels being represented by corresponding icon groups which are visually displayed, and wherein an icon group of a certain state level is used to display a current measurement job of the measuring device, and an icon group of a next lowest level in the hierarchical structure is used to represent at least one of a possible pre-settable execution mode and a selectable execution mode of the measuring job.

* * * * *